United States Patent Office 3,531,511
Patented Sept. 29, 1970

3,531,511
NOVEL ALLYL CARBAMATES
Donald R. Cassady, Robert D. Dillard, and Nelson R. Easton, Indianapolis, Ind., assignors to Eli Lilly and Company, Indianapolis, Ind., a corporation of Indiana
No Drawing. Continuation-in-part of application Ser. No. 533,405, Mar. 11, 1966. This application Oct. 13, 1967, Ser. No. 675,058
Int. Cl. C07c 25/06; C07d 27/02, 29/24
U.S. Cl. 260—468          6 Claims

ABSTRACT OF THE DISCLOSURE

Novel allyl carbamates, useful for their antibacterial and antiviral properties.

BACKGROUND OF THE SPECIFICATION

This is a continuation-in-part of application Ser. No. 533,405, filed Mar. 11, 1966 now Pat. No. 3,436,402, which application is a continuation-in-part of applicatiton Ser. No. 421,677, filed Dec. 28, 1964, now abandoned.

SUMMARY

This invention relates to certain novel carbamates.
The compounds provided by this invention can be represented by the following formula:

$$\begin{array}{c} O \\ \| \\ O-C-Am \\ | \\ R^1-C-CH=CH_2 \\ | \\ R^2 \end{array}$$

wherein $R^1$ and $R^2$, when taken separately, are phenyl, tolyl, monohalophenyl, naphthyl, xenyl, trifluoromethylphenyl, or pyridyl, and when taken together with the carbon atom to which they are attached, fluorenyl, wherein the ethylenic function is attached directly to the 9-position of the fluorenyl radical; Am is —$NR^3R^4$,

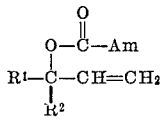

wherein $R^3$, $R^4$, and $R^5$ are hydrogen, $C_1$-$C_8$ alkyl, $C_1$-$C_8$ hydroxyalkyl, di-lower-alkylamino-lower alkyl, $C_3$-$C_8$ alkenyl, $C_3$-$C_8$ alkynyl, $C_3$-$C_8$ cycloalkyl, or $C_5$-$C_8$ bicycloalkyl.

"Lower alkyl," as used herein, is to be understood to mean $C_1$-$C_3$ alkyl viz, methyl, ethyl, n-propyl, and isopropyl.

"$C_1$-$C_8$ alkyl" includes methyl, ethyl, n-propyl, isopropyl, n-butyl, sec.-butyl, tert.-butyl, isobutyl, n-amyl, isoamyl, neopentyl, n-hexyl, isohexyl, and the like.

"$C_3$-$C_8$ alkynyl" refers to the $C_3$-$C_8$ alkyl groups, as defined, from which two hydrogen atoms have been removed from each of two adjacent carbon atoms to produce acetylenic unsaturation, e.g., propargyl, 2-butynyl, 1-pentynyl, 3-hexynyl, and the like.

"$C_3$-$C_8$ alkenyl" refers to the $C_3$-$C_8$ alkyl groups, as defined, from which a hydrogen atom has been removed from each of two adjacent carbon atoms to produce ethylenic unsaturation, e.g., allyl, methallyl, 1-pentenyl, 2-hexenyl, and the like.

"$C_3$-$C_8$ cycloalkyl" includes cyclopropyl, cyclobutyl, cyclopentyl, cyclohexyl, cycloheptyl, and cyclooctyl.

"$C_5$-$C_8$ bicycloalkyl" refers to bicyclo[2.1.0]pentyl, bicyclo[2.2.0]hexyl, bicyclo[1.2.1]hexyl, norbornyl, bicyclo[2.2.2]octyl, and the like.

"Halo" refers to fluoro, chloro, bromo, and iodo.

"Lower-alkoxy" refers to $C_1$-$C_3$ alkoxy, and includes methoxy, ethoxy, n-propoxy, and isopropoxy.

"Lower-alkylamino" refers to $C_1$-$C_3$ alkylamino, and includes methylamino, ethylamino, n-propylamino, and isopropylamino.

"Di-lower-alkylamino" refers to di($C_1$-$C_8$ alkyl) amino, and includes dimethylamino, diethylamino, di-n-propylamino, and diisopropylamino, as well as the mixed-alkyl dialkylamines, e.g., methylethylamine, methylisopropylamine, ethyl-n-propylamine, and the like.

Representative compounds provided by this invention include the following:

1,1-diphenylallyl N-ethylcarbamate
1,1-diphenylallyl N,N-dimethylcarbamate
1-phenyl-1-(p-tolyl)allyl carbamate
1-phenyl-1-(4-bromophenyl)allyl carbamate
1,1-diphenylallyl carbamate
1-(4-bromophenyl)-1-phenylallyl N-methylcarbamate
1-(3-chlorophenyl)-1-phenylallyl carbamate
1-(3-chlorophenyl)-1-phenylallyl N,N-dimethyl-carbamate
1-(3-chlorophenyl)-1-phenylallyl N-methylcarbamate
1,1-diphenylallyl N-(2-propynyl)carbamate
1,1-diphenylallyl N-cyclopropylcarbamate
1-(2-chlorophenyl)-1-phenylallyl carbamate
1-phenyl-1-(2-pyridyl)allyl N-methylcarbamate
1-(4-fluorophenyl)-1-phenylallyl N,N-dimethyl-carbamate
1-(4-fluorophenyl)-1-phenylallyl carbamate
1-(2-naphthyl)-1-phenylallyl 1'-pyrrolidinecarboxylate
1-phenyl-1-(p-chlorophenyl)allyl carbamate
1,1-diphenylallyl N-(3-dimethylaminopropyl)carbamate
1-phenyl-1-(4-biphenylyl)allyl carbamate
1-(3-bromophenyl)-1-phenylallyl carbamate
1-(3-bromophenyl)-1-phenylallyl N,N-dimethyl-carbamate
1,1-diphenylallyl N-methylcarbamate
9-vinyl-9-fluorenyl N-methylcarbamate
1-(3-chlorophenyl)-1-phenylallyl carbamate
1-(4-bromophenyl)-1-phenylallyl 1'-pyrrolidinecarboxylate
1,1-diphenylallyl 4'-(2-hydroxyethyl)-1'-piperazinecarboxylate
1,1-diphenylallyl-4'-methyl-1'-piperazinecarboxylate
1-phenyl-1-(2-naphthyl)allyl N,N-dimethylcarbamate
1-(4-chlorophenyl)-1-phenylallyl 1'-pyrrolidine-carboxylate
1,1-diphenylallyl 1'-piperidinecarboxylate
9-vinyl-9-fluoroenyl N,N-dimethylcarbamate
1-phenyl-1-(2-pyridyl)allyl N,N-dimethylcarbamate
1-(4-chlorophenyl)-1-phenylallyl N-methylcarbamate
1,1-diphenylallyl 4'-morpholinecarboxylate
1,1-diphenylallyl N-cyclohexylcarbamate
1-(4-fluorophenyl)-1-phenyl-5-diethylamino 2-pentenyl-N-cyclopropylcarbamate
1,1-bis(4-fluorophenyl)allyl N-norbornylcarbamate
1,1-diphenylallyl N-bicyclo[2.2.2]octyl carbamate Compounds represented by the above formula can be prepared from the acetylenic derivatives thereof, which compounds are prepared by methods well-known to those skilled in the art, such as the methods of Ensslin and Meier, U.S. Pat. No. 2,798,885; Marshall et al., U.S. Pat. No. 2,814,637; and Mehla and Catlin, U.S. Pat. No. 3,062,870; and by our copending application, Ser. No. 533,405, filed March 1966. The semi-reduced ethylenic derivatives are then prepared by catalytic hydrogenation in the presence of a heavy metal as for example 5% palladium on barium sulfate or 5% palladium on calcium carbonate in the presence of a solid base such as powdered potassium hydroxide, and as described in this specification. A general procedure which can be used for the preparation of the acetylenic carbamates used in the examples below is herein illustrated:

1-(4-bromophenyl-1-phenyl-2-propynyl carbamate

A mixture of 57.4 g. of 1-(4-bromophenyl)-1-phenyl-2-propyn-1-ol, 80 ml. of pyridine, and 200 ml. of dichloromethane was cooled to 0° C. and treated with 31.3 g. of phenyl chloroformate dropwise with stirring over a one-hour period. The reaction mixture was stirred 4 additional hours and 200 ml. of water were added cautiously. Extraction of the crude product with 500 ml. of diethyl ether, separation of the ether layer, and washing the ether layer with 100 ml. of 5 N HCl followed by 100 ml. saturated sodium bicarbonate solution yielded an ethereal solution of phenyl 1-(4-bromophenyl)-1-phenyl-2-propynyl carbonate. This solution was added rapidly with stirring to 400 ml. of anhydrous liquid ammonia. The liquid ammonia was allowed to evaporate over a 4-hour period and was replaced with an equal volume of ether. The ethereal residue was washed with cold, dilute (5 N) sodium hydroxide, dried, and the solvents removed in vacuo. The residual 1-(4-bromophenyl)-1-phenyl-2-propynyl carbamate was recrystallized from benzene and melted at about 137–139° C.

The following compounds, which can be prepared by this procedure, were used in the hereinafter described examples:

1,1-diphenyl-2-propynyl N,N-dimethylcarbamate; melting point: 100–102° C.
1-(4-fluorophenyl)-1-phenyl-2-propynyl N-cyclohexyl-carbamate; melting point: 167–169° C.
1-(4-chlorophenyl)-1-phenyl-2-propynyl carbamate; melting point: 169–171° C.
1,1-diphenyl-2-propynyl N-cyclohexylcarbamate; melting point: 155–157° C.

The following examples illustrate the procedures available for the preparation of the compounds of this invention.

EXAMPLE I 1,1-diphenylallyl N,N-dimethylcarbamate 1,1-diphenyl-2-propynyl N,N-dimethylcarbamate (27.9 g.) was hydrogenated in a 4:1 mixture of benzene-petroleum ether (boiling point 86–100° C.) using 0.5 g. palladium on barium sulfate and 0.5 g. powdered potassium hydroxide as a catalyst. A hydrogen pressure of 40 p.s.i.g. was applied to the solution in an autoclave for 45 minutes. After the uptake of one-tenth mole of hydrogen, the solution was removed from the autoclave, filtered, the solvent removed in vacuo, and the residue recrystallized from petroleum ether (boiling point 30–60° C.) The resulting 1,1-diphenylallyl N,N-dimethylcarbamate (7.5 g.) melted at about 102–104° C.

The following compounds were prepared by the method of Example I using the appropriately substituted propargyl carbamate.

1-(4-fluorophenyl)-1-phenylallyl N-cyclohexylcarbamate; melting point: 165–167° C.
1 - (4 - chlorophenyl)-1-phenylallyl carbamate; melting point: 111–113° C.

EXAMPLE II 1,1-diphenylallyl N-cyclohexylcarbamate 1,1-diphenyl-2-propynyl N-cyclohexylcarbamate was reduced by the method of Example I except that a mixture of 80% methanolic ethyl acetate containing 1.0 g. quinoline was used as solvent. The product obtained after recrystallization, 1,1 - diphenylallyl N-cyclohexylcarbamate, melted at 152–154° C.

1 - (4 - fluorophenyl) - 1 - phenylallyl N-cyclohexylcarbamate was also prepared by the method of Example II. Melting point 165–167° C.

EXAMPLE III 1-(4-fluorophenyl)-1-phenylallyl N-cyclohexylcarbamate

Following the method of Example II, 1-phenyl-1-(4-fluorophenyl)-2-propyn-1-ol was converted to 1-phenyl-1-(4-fluorophenyl)-2-propen-1-ol. Boiling point 112–115° C./0.1 mm. Hg.

A solution of 22.8 g. of the above-named allyl alcohol in 50 ml. of acetonitrile was treated with 16.5 ml. of cyclohexyl isocyanate and then 2.8 g. of potassium carbonate. The resulting mixture was refluxed with stirring for one hour and allowed to cool to room temperature. Methylene chloride and water were added, the layers were separated, and the organic layer was washed with water, dried, and the solvents removed in vacuo. The resulting solid, 1-(4-fluorophenyl)-1-phenylallyl N-cyclohexylcarbamate, was recrystallized from a mixture of benzene and petroleum ether (boiling point 30–60° C.) Melting point 165–167° C.

1,1-bis(4-fluorophenyl)allyl N-cyclohexylcarbamate was also prepared by the method of Example III. Melting point 164–166° C.

The compounds of this invention have several pharmacological and biological properties in common. One of these beneficial properties is the ability to prevent the growth of certain bacteria and fungi in vitro. Several examples of organisms so inhibited include *Staphylococcus aureus, Bacillus subtilis, Mycobacterium avium, Vibrio metschnikovii, Trichophyton mentagrophytes, Scleroinia fructicola*, and certain algae, as for example, *Tetrahymena pyriformis* and *Ochromonas malhamensis*. This activity can be obtained by contacting the growing bacteria with an aqueous suspension or solution of the compound at a concentration of 10–100 μg./ml. A second beneficial property of the compounds of this invention is their antiviral activity. The activity manifests itself especially against influenza virus in infected live mice.

We claim:
1. A compound represented by the following formula:

$$\begin{array}{c} \text{O} \\ \parallel \\ \text{O}-\text{C}-\text{Am} \\ | \\ \text{R}^1-\text{C}-\text{CH}=\text{CH}_2 \\ | \\ \text{R}^2 \end{array}$$

wherein:
$R^1$ and $R^2$, when taken separately, are phenyl, tolyl, monohalophenyl, naphthyl, xenyl, trifluoromethylphenyl, or pyridyl,
$R^1$ and $R^2$, when taken together with the carbon atom to which they are attached, are fluorenyl, wherein the ethylenic function is attached directly to the 9-position of the fluorenyl radical,
Am is $-NR^3R^4$, $$N\diagdown\square, \quad N\diagdown\bigcirc, \quad N\diagdown O, \quad \text{or} \quad N\diagdown N-R^5$$

wherein $R^3$, $R^4$, and $R^5$ are hydrogen, $C_1$–$C_8$ alkyl, $C_1$–$C_8$ hydroxyalkyl, di-lower-alkylamino-lower alkyl, $C_3$–$C_8$ alkenyl, $C_3$–$C_8$ alkynyl, $C_3$–$C_8$ cycloalkyl, or $C_5$–$C_8$ bicycloalkyl.

2. A compound as in claim 1, said compound being 1-(4-chlorophenyl)-1-phenylallyl carbamate.

3. A compound as in claim 1, said compound being 1,1-diphenylallyl N,N-dimethylcarbamate.

4. A compound as in claim 1, said compound being 1,1-diphenylallyl N-cyclohexylcarbamate.

5. A compound as in claim 1, said compound being 1-(4-fluorophenyl)-1-phenylallyl N-cyclohexylcarbamate.

6. A compound as in claim 1, said compound being 1,1-bis(fluorophenyl)allyl N-cyclohexylcarbamate.

References Cited

UNITED STATES PATENTS 3,340,294  9/1967  Richter et al. _____ 260—482
3,133,902  5/1964  Denchfield et al. _____ 260—77.5

LORRAINE A. WEINBERGER, Primary Examiner

R. GERSTL, Assistant Examiner

U.S. Cl. X.R.

260—247.2, 268, 294.3, 295, 326.3, 482